US005365227A

United States Patent [19]

Cannon et al.

[11] Patent Number: 5,365,227

[45] Date of Patent: Nov. 15, 1994

[54] METHOD AND APPARATUS FOR TRANSMITTING STATUS INFORMATION FROM A SELECTIVE CALL RECEIVER TO AN EXTERNAL ELECTRONIC DEVICE

[75] Inventors: Gregory L. Cannon, Coconut Creek; William J. Macko, West Palm Beach; Gregory W. Fuller, Boca Raton; Jill L. Theobald, Boynton Beach, all of Fla.

[73] Assignee: Motorola, Inc., Schaumburg, Ill.

[21] Appl. No.: 909,262

[22] Filed: Jul. 6, 1992

[51] Int. Cl.[5] .......... H04Q 5/24

[52] U.S. Cl. .......... 340/825.55; 340/825.44; 364/715.01; 364/705.01

[58] Field of Search .......... 340/825.44, 311.1, 825.55; 364/705.01, 705.05, 715.01

[56] References Cited

U.S. PATENT DOCUMENTS

| | | | |
|---|---|---|---|
| 4,724,528 | 2/1988 | Eaton | 364/715.01 |
| 4,856,047 | 8/1989 | Saunders | 340/825.44 |
| 4,857,883 | 8/1989 | Mama | 340/311.1 |
| 4,949,085 | 8/1990 | Frach et al. | 340/825.44 |
| 4,972,457 | 11/1990 | O'Sullivan | 379/59 |
| 5,032,825 | 7/1991 | Kuzuicki | 340/825.44 |
| 5,043,721 | 8/1991 | May | 340/825.44 |
| 5,075,684 | 12/1991 | DeLuca | 340/825.44 |
| 5,140,310 | 8/1992 | DeLuca et al. | 340/825.44 |
| 5,252,964 | 10/1993 | Tan et al. | 340/825.44 |
| 5,309,174 | 5/1994 | Minkus | 340/825.44 |

*Primary Examiner*—Donald J. Yusko
*Assistant Examiner*—Edward Merz
*Attorney, Agent, or Firm*—Kelly A. Gardner

[57] ABSTRACT

A selective call receiver (100) for transmitting information to an external electronic device (208), such as a personal computer, includes a memory (125) for storing a predetermined status menu including at least one status category associated with internal status information of the selective call receiver (108). When the selective call receiver (100) is interactively coupled to the external electronic device (208) and receives a user-initiated status command therefrom, the predetermined status menu is retrieved from the memory (125) and transmitted to the external electronic device (208).

20 Claims, 7 Drawing Sheets

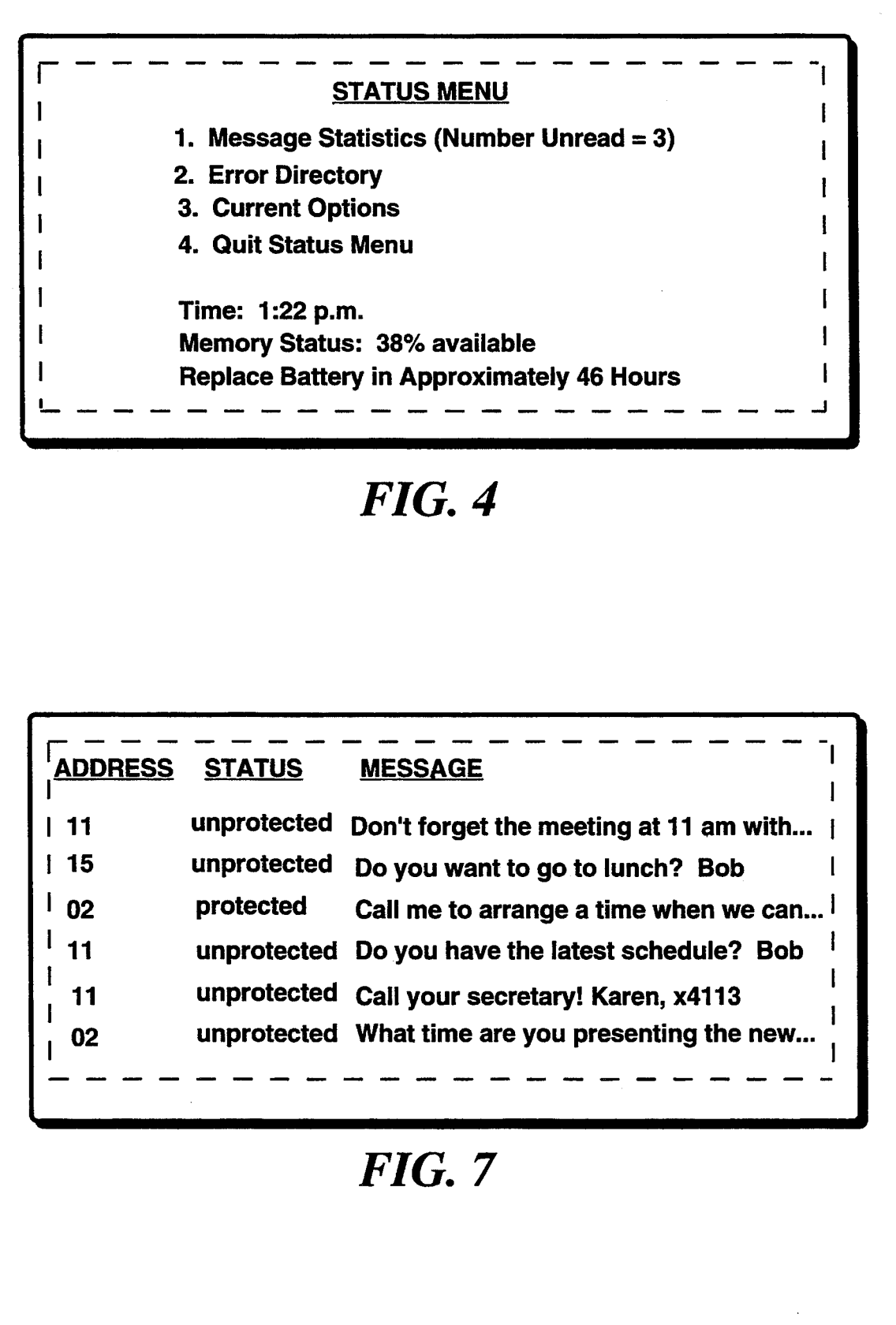

STATUS MENU

1. Message Statistics (Number Unread = 3)
2. Error Directory
3. Current Options
4. Quit Status Menu Time: 1:22 p.m.
Memory Status: 38% available
Replace Battery in Approximately 46 Hours

*FIG. 4*

| ADDRESS | STATUS | MESSAGE |
|---|---|---|
| 11 | unprotected | Don't forget the meeting at 11 am with... |
| 15 | unprotected | Do you want to go to lunch? Bob |
| 02 | protected | Call me to arrange a time when we can... |
| 11 | unprotected | Do you have the latest schedule? Bob |
| 11 | unprotected | Call your secretary! Karen, x4113 |
| 02 | unprotected | What time are you presenting the new... |

*FIG. 7*

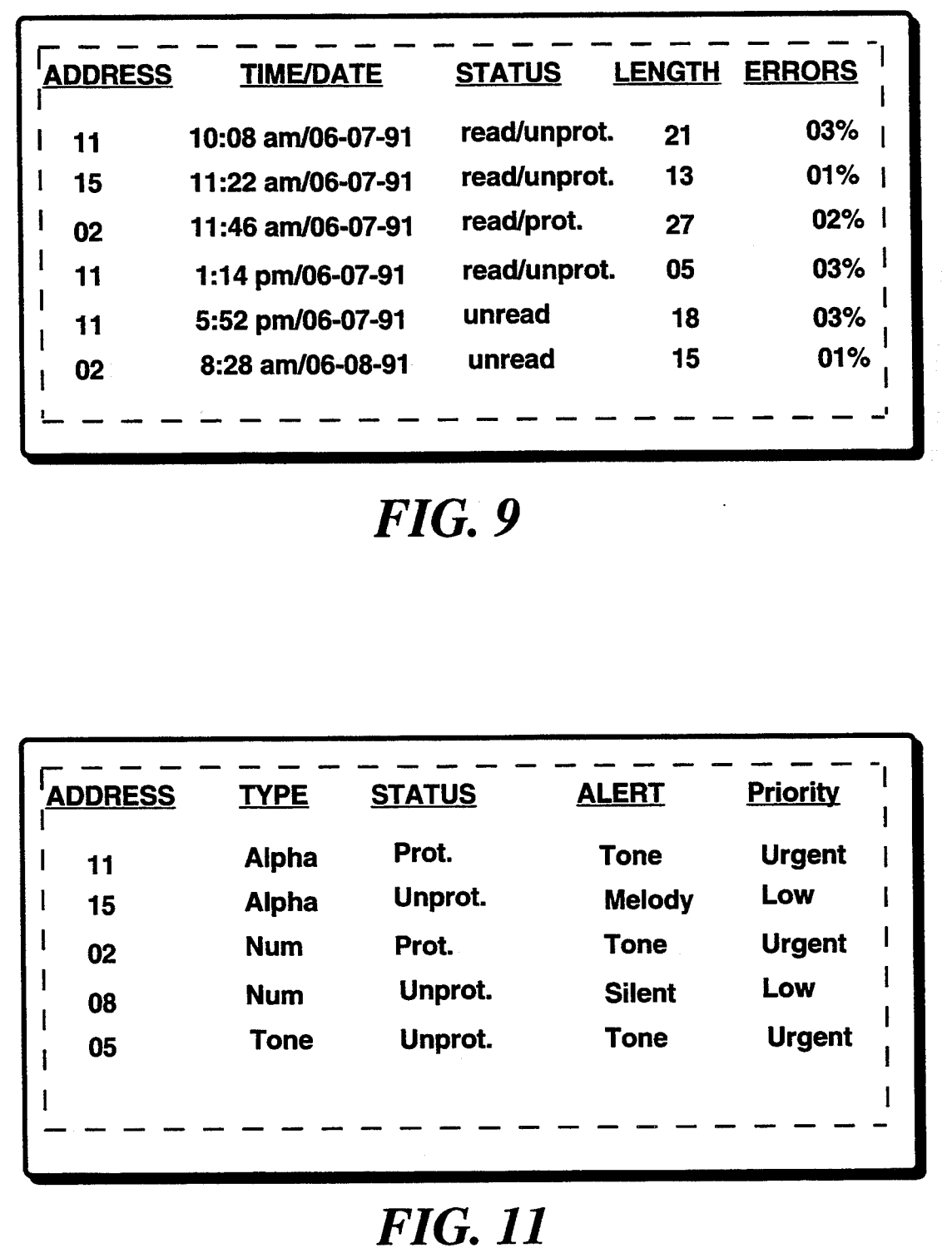

| ADDRESS | TIME/DATE | STATUS | LENGTH | ERRORS |
|---|---|---|---|---|
| 11 | 10:08 am/06-07-91 | read/unprot. | 21 | 03% |
| 15 | 11:22 am/06-07-91 | read/unprot. | 13 | 01% |
| 02 | 11:46 am/06-07-91 | read/prot. | 27 | 02% |
| 11 | 1:14 pm/06-07-91 | read/unprot. | 05 | 03% |
| 11 | 5:52 pm/06-07-91 | unread | 18 | 03% |
| 02 | 8:28 am/06-08-91 | unread | 15 | 01% |

*FIG. 9*

| ADDRESS | TYPE | STATUS | ALERT | Priority |
|---|---|---|---|---|
| 11 | Alpha | Prot. | Tone | Urgent |
| 15 | Alpha | Unprot. | Melody | Low |
| 02 | Num | Prot. | Tone | Urgent |
| 08 | Num | Unprot. | Silent | Low |
| 05 | Tone | Unprot. | Tone | Urgent |

*FIG. 11*

METHOD AND APPARATUS FOR TRANSMITTING STATUS INFORMATION FROM A SELECTIVE CALL RECEIVER TO AN EXTERNAL ELECTRONIC DEVICE

FIELD OF THE INVENTION

This invention relates in general to selective call receivers, and more specifically to a method and apparatus for transmitting status information from a selective call receiver to an external electronic device.

BACKGROUND OF THE INVENTION

Selective call receivers, such as pagers, receive radio frequency (RF) signals. Conventionally, the selective call receiver decodes message data contained in a received RF signal and alerts a user that a message has been received, subsequent to which the message may be stored in a memory. The selective call receiver may present the message to a user either automatically or manually, upon selection by the user. The message may, for example, be presented visibly by a display device, such as a liquid crystal display (LCD), or audibly by an audio speaker.

Additionally, the selective call receiver may present the user with internal status information. Because of the space constraints existing in conventional selective call receivers, however, the size of the LCD incorporated by the selective call receiver is usually kept to a minimum. Therefore, the status information to which the user has access is typically limited to an amount of information that can be easily displayed on a small LCD. Such status information may be displayed to inform the user when battery voltage is low, when the selective call receiver is out of range, when a received message duplicates a previously received message, etc. This status information is frequently presented to the user in the form of iconic indicators or alphanumeric abbreviations displayed on the LCD. Although, in this manner, the user may be informed of many different internal status parameters, such displays of status information are often difficult to decipher without consulting a product operation manual that describes the different icons and abbreviations.

If the selective call receiver uses an audio speaker as a presentation device, the status information to which the user has access is even more limited. In this case, the status information presented to the user may consist only of critical status information relevant to the operation of the selective call receiver. For example, the user may be informed by a tone emitted by the speaker if the voltage of a battery providing primary power to the selective call receiver drops below a predetermined threshold. If the selective call receiver is capable of presenting information about more than one internal operational parameter to the user, the user might be forced to remember the meanings of several different tones used to announce the status of the corresponding operational parameters. In either case, internal status information presented by the selective call receiver may not be easily understood by the user.

Thus, what is needed is a method and apparatus for transmitting status information from a selective call receiver to an external electronic device capable of coherently presenting large amounts of information to a user.

SUMMARY OF THE INVENTION

A selective call receiver having internal status parameters and is interactively coupled to an external electronic device. A method for transmitting data concerning the internal status parameters of the selective call receiver to the electronic device comprises the steps of receiving a user-initiated status command from the selectronic device and retrieving a predetermined status menu from a memory in response to reception of the status command, wherein the status menu comprises at least one status category associated with status information about the selective call receiver. The status menu is transmitted to the electronic device for display thereby.

A selective call receiver for transmitting information to an external electronic device comprises a receiver for receiving selective call messages and a memory coupled to the receiver for storing the selective call messages and for storing a predetermined status menu including at least one status category associated with internal status information of the selective call receiver. A controller coupled to the receiver and the memory controls the operation thereof, and communication means coupled to the controller and the memory receives, when interactively coupled to the external electronic device, a user-initiated status command from the external electronic device. In response thereto, the communication means retrieves the status menu from the memory and transmits the status menu to the external electronic device.

BRIEF DESCRIPTION OF THE DRAWINGS

FIG. 4 is an illustration of a status menu displayed by the external electronic device of FIG. 2 in accordance with the preferred embodiment of the present invention.

FIG. 7 is an illustration of a message statistics screen displayed by the external electronic device of FIG. 2 in accordance with the preferred embodiment of the present invention.

FIG. 9 is an illustration of an error directory screen displayed by the external electronic device of FIG. 2 in accordance with the preferred embodiment of the present invention.

FIG. 11 is an illustration of a current options screen displayed by the external electronic device of FIG. 2 in accordance with the preferred embodiment of the present invention.

DESCRIPTION OF A PREFERRING EMBODIMENT

Figure 1:
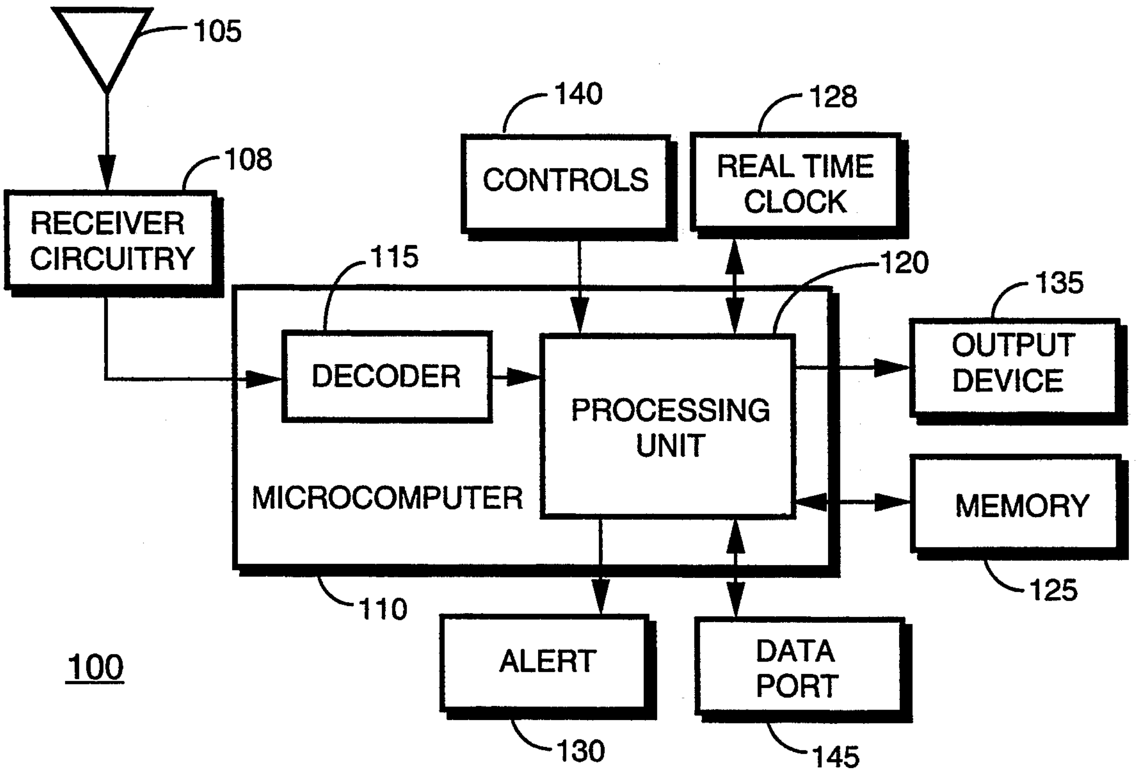
FIG. 1 is a block diagram of a selective call receiver in accordance with a preferred embodiment of the present invention.

Referring to FIG. 1, a block diagram of a selective call receiver 100 in accordance with a preferred embodiment of the present invention is depicted. The selective call receiver 100, e.g., a pager, comprises an antenna 105 for receiving a radio frequency (RF) signal and receiver circuitry 108 coupled to the antenna 105 for demodulating the RF signal. A microcomputer 110 coupled to the receiver circuitry 108 comprises a decoder 115 for decoding the signal to recover an address and a message contained therein and a processing unit 120 for storing the message in a memory 125. Preferably, a real time clock 128 coupled to the processing unit 120 provides real time values which are also stored in the memory 125 as each message is received. The processing unit 120 further processes the message and sends a signal to an alert mechanism 130, in response to which an alert is generated to announce reception of a message. The processing unit 120 may send a further signal directing an optional output device 135, e.g., an audio speaker or a liquid crystal display (LCD), to present the message. The presentation of the message may be performed automatically or, upon reception by the processing unit 120 of a signal from user actuated controls 140, manually.

In accordance with the preferred embodiment of the present invention, the processing unit 120 monitors internal status information, for example, battery voltage and time. In response to reception of a user-initiated request for status information, the processing unit 120 may retrieve the requested status information, such as the number of unread messages or the contents of a specified message, from the memory 125. Alternatively, the processing unit 120 may perform calculations to obtain the requested status information, as would be the case if the user wishes to view the amount of space in the memory 125 that is currently available for message storage. Thereafter, the processing unit 120 formats the status information into a desired format, e.g., a text format, and transmits the requested status information to a data port 145, located on the exterior of the selective call receiver 100, for subsequent transference to an external electronic device coupled to the selective call receiver 100.

Figure 2:
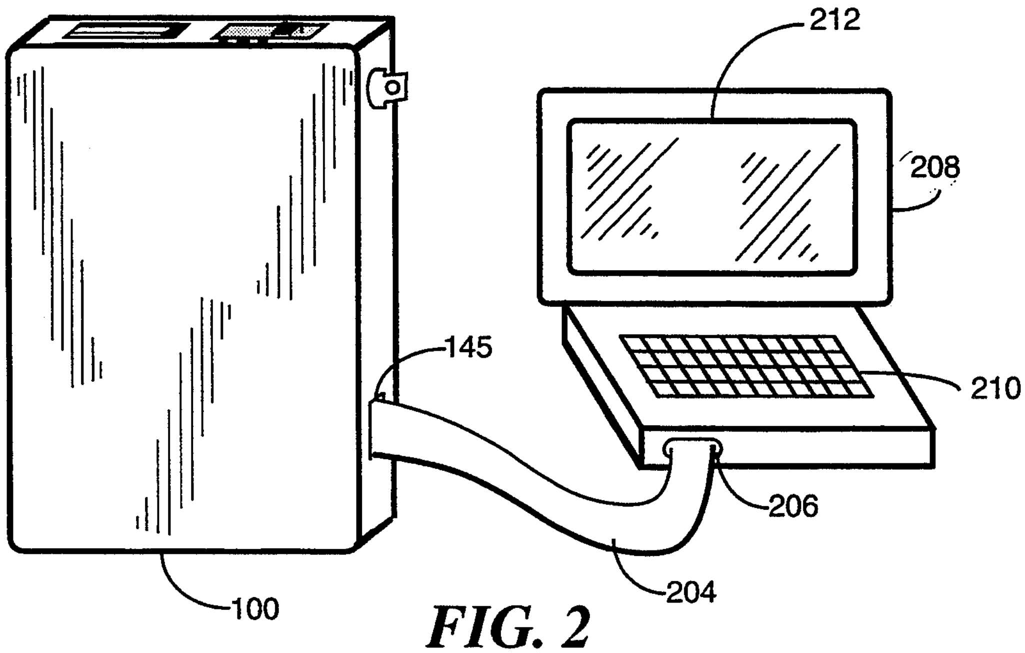
FIG. 2 depicts an interactive coupling of the selective call receiver of FIG. 1 to an external electronic device in accordance with the preferred embodiment of the present invention.

Referring to FIG. 2, the data port 145 located on the exterior of the selective call receiver 100 is coupled, via an RS-232 interface 204, to a data port 206 located on the exterior of an external electronic device 208. The electronic device 208 preferably incorporates a keyboard 210 and a display device 212 of sufficient size to display a large amount of data. When prompted by a user-initiated request entered via the keyboard 210, the electronic device 208 sends a request for status information to the selective call receiver 100 across the RS232 interface 204. In response thereto, the processing unit 120 (FIG. 1) retrieves the requested status information from the memory 125 or performs calculations to obtain the requested status information. Once properly formatted by the processing unit 120, the requested status information is transferred to the electronic device 208 for subsequent display on the display device 212. Alternatively, the processing unit 120 may automatically transfer information to the electronic device 208. This information could be transferred, for example, when one or more of the monitored operational parameters exceeds a predetermined threshold. In this manner, the user, in addition to requesting desired status information, can be automatically alerted in critical situations, e.g., the battery voltage is too low to sustain operation of the selective call receiver 100.

In accordance with the preferred embodiment of the present invention, the display device 212 is of sufficient size to display a large amount of data in a form that is easily read by the user. Therefore, the status information does not need to be presented as abbreviations or icons that are difficult to decipher, unlike most status information presented by a conventional selective call receiver. Furthermore, status information may be displayed in the form of a chart or spreadsheet, thereby allowing the user to read related blocks of status information without having to scroll through the information line by line on a conventional LCD.

Figure 3:
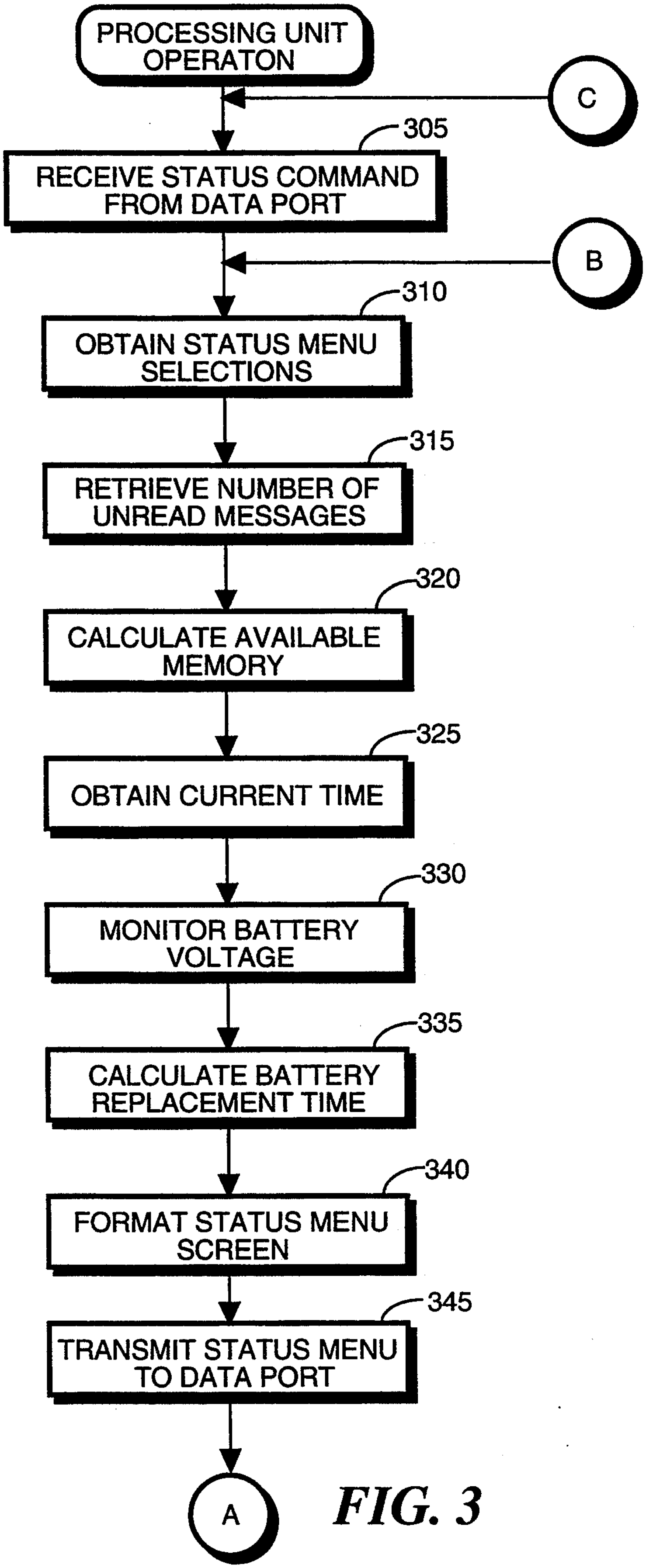
FIG. 3 is a flowchart depicting the operation of the microcomputer processing unit of FIG. 1 in accordance with the preferred embodiment of the present invention.

FIG. 3 depicts the operation of the microcomputer processing unit 120 (FIG. 1) in accordance with the preferred embodiment of the present invention. The initial step in the illustrated process occurs when the processing unit 120 receives 305 a user-initiated status command from the electronic device 208 (FIG. 2). In response to reception of the status command, the processing unit 120 obtains 310 information, such as status selections which are to be subsequently displayed on a status menu screen by the electronic device 208, from the memory 125 (FIG. 1). Preferably, additional information of concern to the user is also displayed on the status menu screen. According to the present invention, the processing unit retrieves 315 the number of unread messages from the memory 125 and calculates 320 the available space in the memory 125. The processing unit 120 further obtains 325 the current time from the real time clock 128 (FIG. 1) and monitors 330 the voltage of a battery providing primary power to the selective call receiver 100. Thereafter, the approximate number of hours before the battery should be replaced is calculated 335 by the processing unit 120. After formatting 340 the information to be displayed on the status menu screen, the processing unit 120 transmits 345 the information to the data port 145 (FIG. 1). The information is subsequently transferred across the RS-232 interface 204 to the electronic device 208 (FIG. 2).

The information transferred to the electronic device 208 is displayed as a status menu, as may be better understood by referring to FIG. 4. Although, in accordance with the preferred embodiment of the present invention, the status menu displays the current time, the available memory, the number of unread messages, and the approximate time after which the battery may need to be replaced, it may be appreciated that different or additional status information could be displayed in alternate embodiments of the present invention. The status menu according to the present invention further displays a list of status selections from which the user may choose more detailed status information. Preferably, the user may select statistics about the messages stored in the memory 125 (FIG. 1), error information, or current option settings of the selective call receiver 100. The user may terminate the display of the status menu simply by selecting a "quit" option from the menu selections. In this manner, status information which may be of importance is displayed such that it may be easily read by the user. If the user then decides that more detailed status information is necessary, he may select one of the available status selections.

Figure 5:
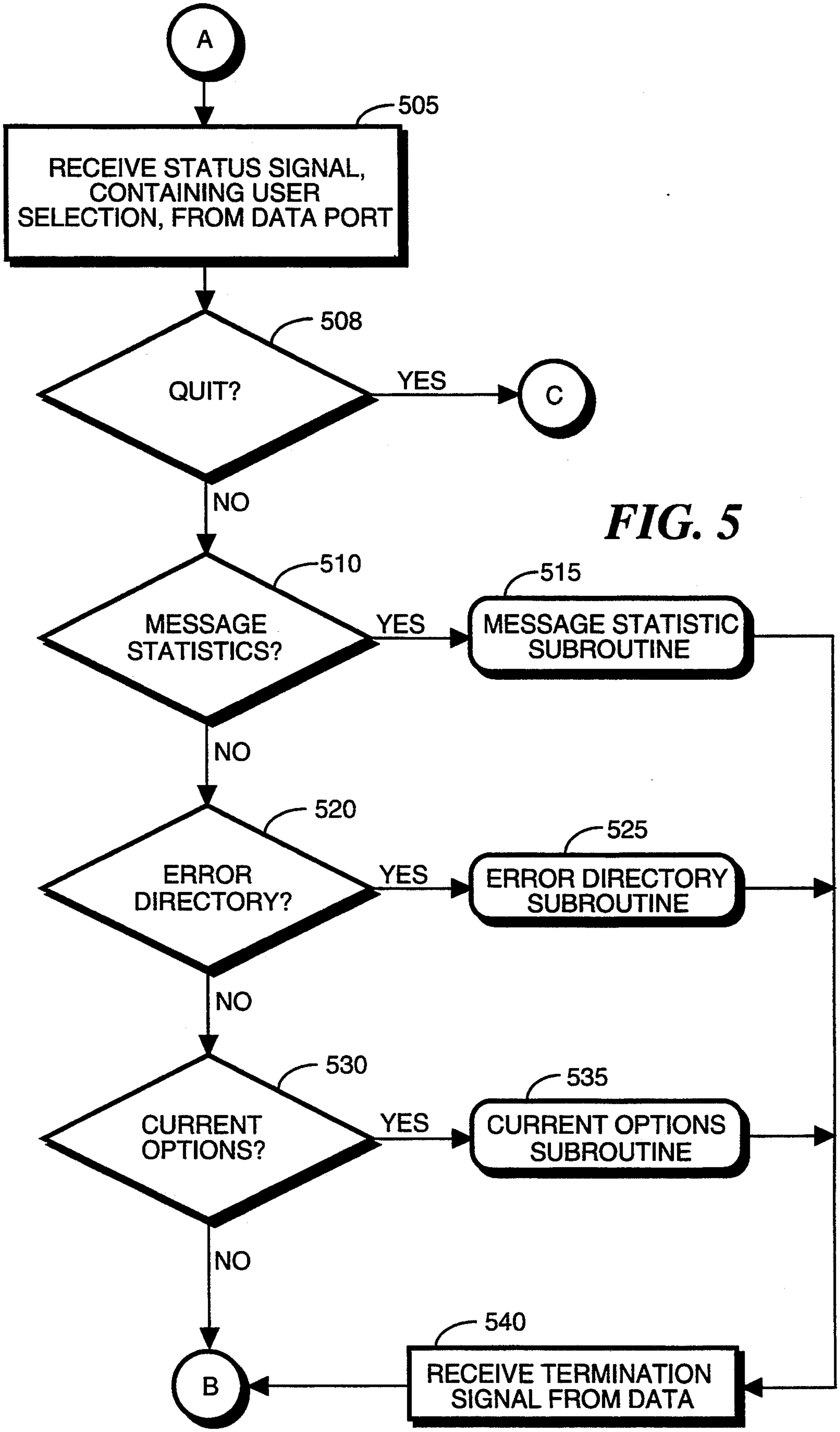
FIG. 5 is a flowchart depicting the further operation of the microcomputer processing unit of FIG. 1 in accordance with the preferred embodiment of the present invention.

Referring next to FIG. 5, a flowchart illustrates the further operation of the microcomputer processing unit 120 (FIG. 1) in accordance with the preferred embodiment of the present invention. If the user is satisfied with the status information presented by the status menu, he may choose the "quit" selection from the menu. Alternatively, as described in FIG. 4, the user may desire to view more detailed status information than is normally provided by the status menu. In either case, after the user has entered his selection, a status signal, containing information about the user selection, is thereafter relayed, via the RS-232 interface 204, to the data port 145 (FIG. 2) of the selective call receiver 100. The processing unit 120 (FIG. 1) subsequently receives 505 the status signal from the data port 145.

If the processing unit 120 determines 508 that the status signal contains a command to quit the status menu, the processing unit 120 simply waits for reception 305 (FIG. 3) of a further status command. Alternatively, a request for statistics about the stored messages could be included 510 in the status signal, in response to which the processing unit 120 performs a message statistics subroutine 515. If the processing unit determines 520 that a request for error information is included in the status signal, an error directory subroutine 525 is performed. In addition to the above described status requests, the status signal could contain 530 a request for information about the option settings of the selective call receiver 100 (FIG. 2), in which case a current options subroutine 535 is performed by the processing unit 120. As described below, the performance of each of the subroutines involves the retrieval or calculation of the requested status information for subsequent transmission to the electronic device 208 (FIG. 2). The requested information is thereafter displayed by the display device 212 (FIG. 2) of the electronic device 208.

In accordance with the preferred embodiment of the present invention, the processing unit 120 receives 540 a termination signal from the electronic device 208 after the requested status information has been displayed. This termination signal may be generated in response to a user-initiated keyboard entry or, alternatively, the termination signal may be automatically generated by the electronic device 208 after expiration of a predetermined amount of time. Upon reception 540 of the termination signal, the processing unit 120 again retrieves, formats, and sends the status menu information to the data port 145, as described in FIG. 3, for subsequent transmission to the electronic device 208. Thereafter, the user may again make a selection from the status menu.

Figure 6:
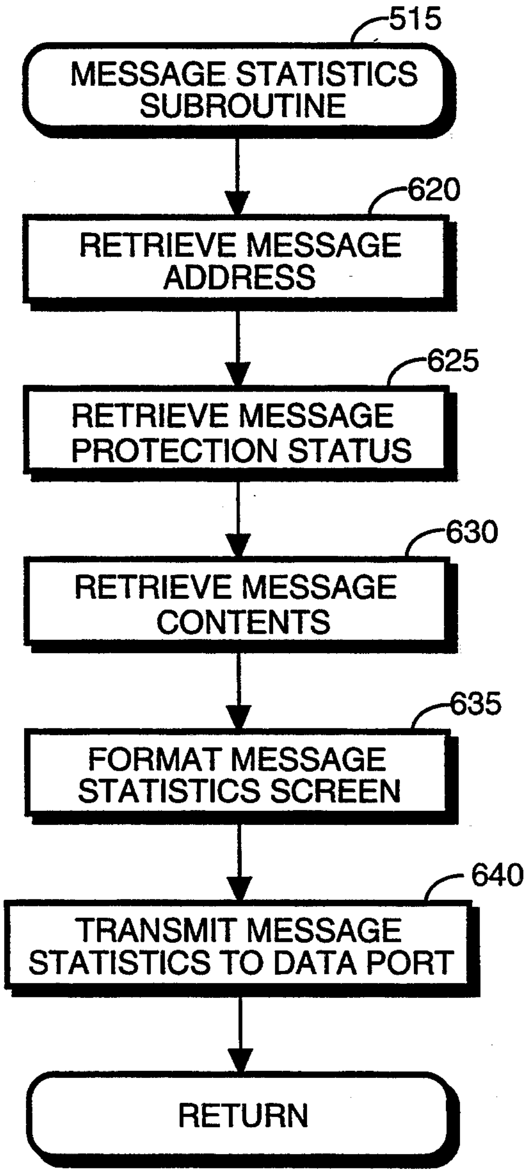
FIG. 6 is a flowchart depicting a message statistics subroutine performed by the microcomputer processing unit of FIG. 1 in accordance with the preferred embodiment of the present invention.

FIG. 6 illustrates the message statistics subroutine 515, as described in FIG. 5. According to the present invention, the processing unit 120 retrieves 620, 625, 630 the address, protection status, and contents of each message stored in the memory 125 (FIG. 1). It may be appreciated, however, that alternate embodiments of the present invention may involve the retrieval of additional or different message-related status information, such as message errors or time of message reception. Subsequent to retrieval of the status information, the processing unit 120 formats 635 the retrieved information for transmission 640 to the data port 145 (FIG. 2). The message statistics information is thereafter transferred across the RS-232 interface 204 and displayed by the electronic device 208 (FIG. 2).

An example of a possible presentation of the message statistics information is illustrated in FIG. 7. Preferably, the address, protection status, and contents of each message are displayed in a chart that is easily read by the user. The user can, for example, determine the type of message, such as personal or business, from the address on which it was received by the selective call receiver 100 (FIG. 2). The user can also view the protection status of each message and thereby determine which messages are protected from deletion. In this manner, the user is able, after reading each of the messages, to determine whether an important message is unprotected and thus in danger of deletion.

Figure 8:
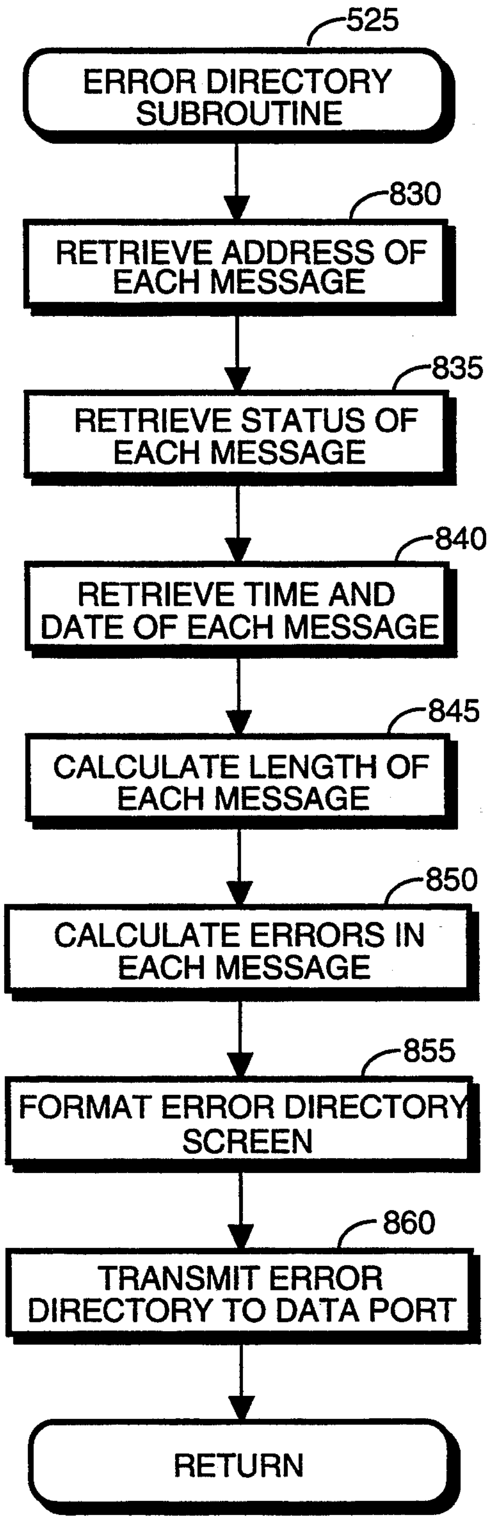
FIG. 8 is a flowchart depicting an error directory subroutine performed by the microcomputer processing unit of FIG. 1 in accordance with the preferred embodiment of the present invention.

Referring next to FIG. 8, a flowchart depicts the error directory subroutine 525 of FIG. 5. Upon reception of a status signal containing a request for error information, the processing unit 120 (FIG. 1) retrieves 830, 835 the address and the status of each stored message. The time and date of the reception of each message are further retrieved 840 from the memory 125 (FIG. 1). Subsequent to calculating 850, 855 the length of each message and the errors in each message, the processing unit 120 formats 855 the error information into a desired format, e.g., an error directory, in a manner well known to one skilled in the art. The error directory is thereafter transmitted 860 to the data port 145 (FIG. 1) for subsequent display by the electronic device 208 (FIG. 2).

As shown in FIG. 9, the error directory preferably displays the error information in a chart format that may be easily read by the user. The user may, by requesting presentation of the error directory, view an entire block of related status information. Such a display would be impossible on a conventional selective call receiver LCD, which would typically display short abbreviations or iconic displays to present status information.

Figure 10:
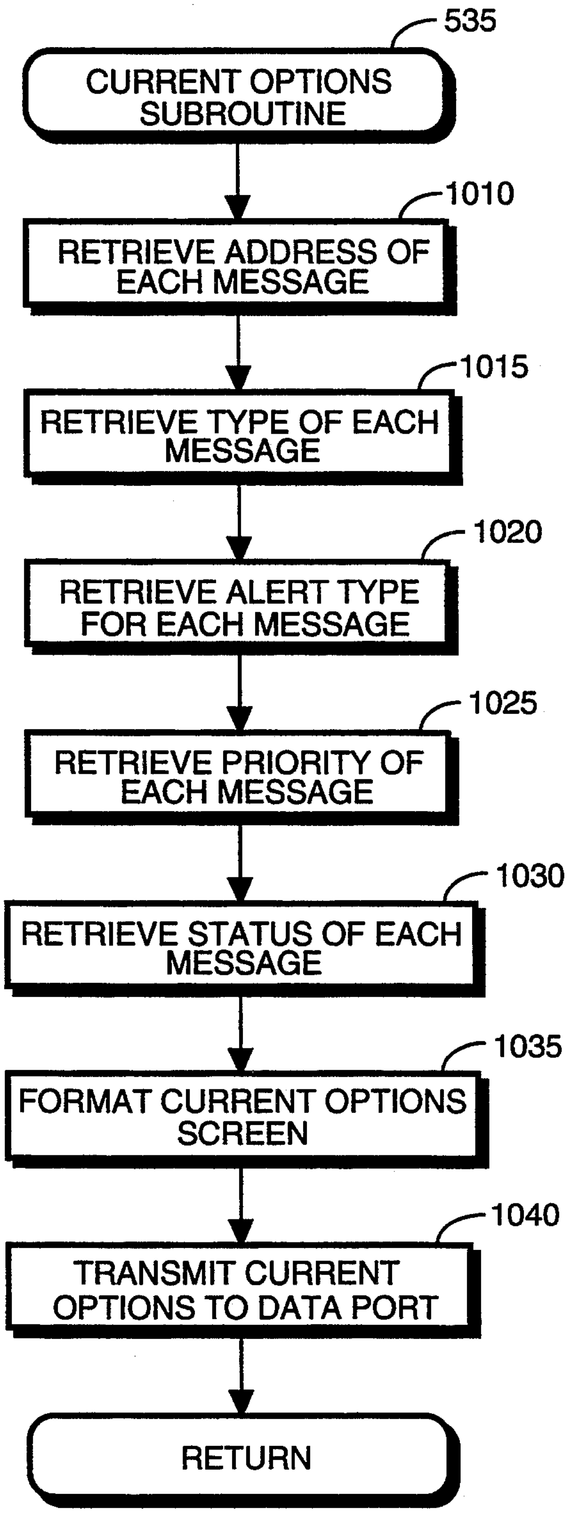
FIG. 10 is a flowchart depicting a current options subroutine performed by the microcomputer processing unit of FIG. 1 in accordance with the preferred embodiment of the present invention.

As described in FIG. 5, a current options subroutine 535, depicted in FIG. 10, is performed in response to the appropriate request by the user. The initial step performed by the processing unit 120 (FIG. 1) is the retrieval of information about option settings from the memory 125. The information retrieved, in accordance with the preferred embodiment of the present invention, includes the addresses 1010 on which the selective call receiver 100 (FIG. 1) receives messages. The processing unit 120 further retrieves the type 1015 of message, such as alphanumeric or numeric, the type of alert 1020, the priority 1025, and the protection status 1030 associated with each address. Thereafter, the information retrieved by the processing unit 120 is formatted 1035 for subsequent transmission 1040 to the electronic device 208 (FIG. 2) via the data port 145 (FIG. 1).

The formatted information about the option settings of the selective call receiver 100 is displayed by the electronic device 208, preferably as shown in FIG. 11. By viewing this screen, the user is able to see, at a glance, the settings, such as alert type and priority of the messages received on different addresses, and make changes accordingly. For example, the user may, after viewing the screen, decide to change the settings so that all of the low priority messages are announced with a silent alert and all of the high priority messages are automatically protected. The option settings displayed on the electronic device 208 are, however, dependent on the type of selective call receiver 100. The user of a "tone only" selective call receiver that receives messages on only one address, for example, would find the above described information meaningless. In this case, the displayed option settings might simply consist of the type of tone employed to announce reception of a message.

In summary, the transmission of status information from a selective call receiver to an external electronic device for subsequent display on a large display device allows the user to view status information to which he may not conventionally have had access. For example, in accordance with the preferred embodiment of the present invention, the user is presented with an approximate replacement time for the battery powering the selective call receiver, whereas, in conventional pagers, the user is only presented with battery status information after the voltage drops below a predetermined threshold. Furthermore, because the status information is displayed by a display device that is larger than a typical LCD, large amounts of the status information may be displayed, thereby preventing the user from having to scroll through numerous lines of information, such as the contents of a lengthy message, on a conventional LCD. Additionally, the displayed information may be conveniently presented in the form of charts or spreadsheets, thus providing for the display of large amounts of related information in a manner that is easily understood by the user. The employment of the large display device thereby prevents the user from having decipher icons or abbreviations that are typically presented by conventional selective call receivers.

A still further feature of the present invention is the utilization of a status menu which offers categorized status choices to the user . This feature allows the user to advantageously select specific areas of status information in which he is interested. Therefore, the user may quickly pinpoint an area of concern, such as available memory or time of message reception, from the status menu and choose to be presented with the selected information. In this manner, the user may avoid situations in which the selective call receiver only displays status information after an undesirable occurrence, such as when an important message has been deleted because the memory is full.

By now it should be appreciated that there has been provided a method and apparatus for transmitting status information from a selective call receiver to an external electronic device capable of coherently presenting large amounts of information to a user.

We claim:

1. A method, in a selective call receiver having internal status parameters and being interactively coupled to an external electronic device, for transmitting data concerning the internal status parameters to the electronic device, the method comprising the steps of:

(a) receiving a user-initiated status command from the electronic device;

(b) retrieving, in response to step (a), a predetermined status menu from a memory, wherein the status menu comprises at least one status category associated with status information about the selective call receiver; and (c) transmitting the status menu to the electronic device for display thereby.

2. The method in accordance with claim 1, further comprising the steps of:

(d) receiving, subsequent to step (c), a user-initiated status selection from the electronic device, wherein the user-initiated status selection identifies a status category chosen from the at least one status category of the status menu;

(e) retrieving, in response to step (d), status information corresponding to the chosen status category from the memory; and (f) transmitting the status information corresponding to the chosen status category to the electronic device.

3. The method in accordance with claim 2, wherein the at least one status category of the status menu includes a message error category, an available memory category, and an options category, and wherein step (e) comprises the step of:

(g) retrieving, in response to step (d), information about errors included in received messages from the memory when the chosen status category is the message error category.

4. The method in accordance with claim 2, wherein step (e) comprises the of:

(h) retrieving related information corresponding to the status information from a memory; and (i) calculating the status information from the related information.

5. The method in accordance with claim 2, wherein step (e) comprises the step of:

(j) monitoring, in response to step (d), an internal status parameter to obtain the status information corresponding to the chosen status category.

6. The method in accordance with claim 2, further comprising the step of:

(k) formatting the status information corresponding to the chosen status category prior to step (f).

7. The method in accordance with claim 1, further comprising the steps of:

(l) obtaining, in response to step (a), predetermined status information; and (m) transmitting the predetermined status information to the electronic device for display thereby concurrently with the display of the status menu.

8. The method in accordance with claim 7, further comprising the steps of:

(n) formatting the status menu prior to step (c); and (o) formatting the predetermined status information prior to step (m).

9. The method in accordance with claim 7, wherein step (l) comprises the step of:

(p) obtaining, in response to step (a), predetermined status information, wherein the predetermined status information comprises information about battery life and time.

10. A method, in a selective call receiver having internal status parameters and being interactively coupled to an external electronic device, for transmitting data to the electronic device, the method comprising the steps of:

(a) receiving a user-initiated status command from the electronic device;

(b) retrieving, in response to step (a), a predetermined status menu from a memory, wherein the status menu comprises at least one status category;

(c) obtaining, in response to step (a), predetermined status information, wherein the predetermined status information comprises information concerning the internal status parameters;

(d) transmitting the status menu to the electronic device;

(e) transmitting the predetermined status information to the electronic device;

(f) receiving a user-initiated request for status information chosen from the at least one status category, wherein the requested status information comprises further information concerning the internal status parameters;

(g) obtaining, in response to step (f), the requested status information; and (h) transmitting the requested status information to the electronic device.

11. The method in accordance with claim 10, further comprising the steps of:

(i) formatting, prior to step (d), the status menu;

(j) formatting, prior to step (e), the predetermined status information; and (k) formatting, prior to step (h), the requested status information.

12. The method in accordance with claim 10, wherein step (c) comprises the step of:

(l) retrieving, in response to step (a), the predetermined status information from a memory.

13. The method in accordance with claim 10, wherein step (c) comprises the steps of:

(m) retrieving, in response to step (a), related information from a memory; and (n) calculating the predetermined status information from the related information.

14. The method in accordance with claim 10, wherein step (g) comprises the step of:

(o) retrieving, in response to step (f), the requested status information from a memory.

15. The method in accordance with claim 10, wherein step (g) comprises the steps of:

(p) retrieving, in response to step (f), related information from a memory; and (q) calculating the requested status information from the related information.

16. A selective call receiver for transmitting information to an external electronic device, comprising:

receiver means for receiving selective call messages;

storage means coupled to the receiver means for storing the selective call messages and for storing a predetermined status menu including at least one status category associated with internal status information of the selective call receiver;

control means coupled to the receiver means and the storage means for controlling the operation thereof; and communication means coupled to the control means and the storage means for receiving, when interactively coupled to the external electronic device, a user-initiated status command from the external electronic device and, in response thereto, retrieving the status menu from the storage means and transmitting the status menu to the external electronic device.

17. The selective call receiver in accordance with claim 16, wherein the selective call receiver further comprises monitoring means coupled to the control means, the storage means, and the communication means for monitoring the internal status information, wherein the internal status information comprises at least information about the stored messages and information concerning the operation of the receiver means and the storage means.

18. The selective call receiver in accordance with claim 17, wherein the communication means further receives a user-initiated status selection chosen from the at least one status category of the status menu and, in response to the status selection provided by the external electronic device, transmits the requested information to the external electronic device with reference to the monitoring means.

19. A selective call receiver for transmitting information to an external electronic device, comprising:

a receiver for receiving selective call messages;

a memory coupled to the receiver for storing the selective call messages and a predetermined status menu having status categories including an error category, an available memory category, and an options category, wherein the status categories are associated with related internal status information;

controlling circuitry coupled to the receiver and the memory for controlling the operation thereof;

monitoring circuitry coupled to the controlling circuitry and the memory for monitoring the related internal status information; and a data port coupled to the monitoring circuitry and the memory for retrieving the status menu from the memory, wherein the data port, when interactively coupled to the external electronic device, receives a user-initiated status command from the external electronic device and, in response thereto, transmits the status menu to the external electronic device.

20. The selective call receiver in accordance with claim 19, wherein the data port comprises receiving means for receiving a user-initiated status selection from the external electronic device, the user-initiated status selection indicating one of the status categories, and transmitting means for transmitting, with reference to the monitoring circuitry, the related status information corresponding to the chosen status category to the external electronic device.

* * * * *

UNITED STATES PATENT AND TRADEMARK OFFICE

CERTIFICATE OF CORRECTION

PATENT NO. : 5,365,227

DATED : November 15, 1994

INVENTOR(S) : Gregory L. Cannon

It is certified that error appears in the above-indentified patent and that said Letters Patent is hereby corrected as shown below:

Column 8, line 23, after comprises the insert --steps--.

Signed and Sealed this

Twenty-first Day of November, 1995

Attest:

BRUCE LEHMAN

Attesting Officer

Commissioner of Patents and Trademarks